March 8, 1955  T. J. STUEVEN  2,703,733
FEED MILL BLOWER
Filed Jan. 8, 1951
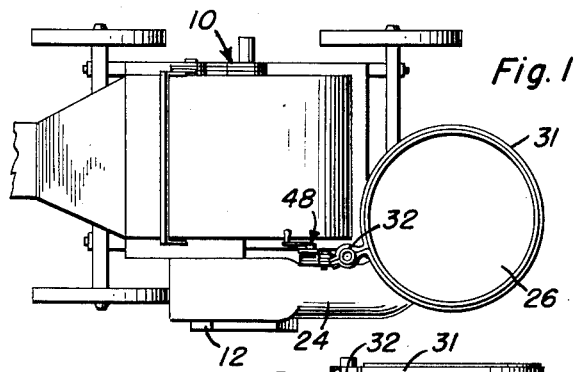
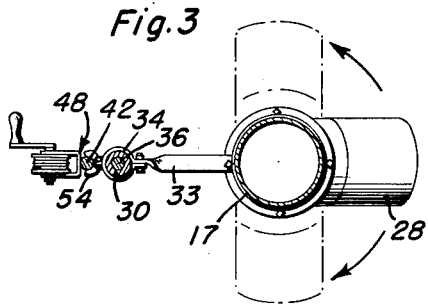
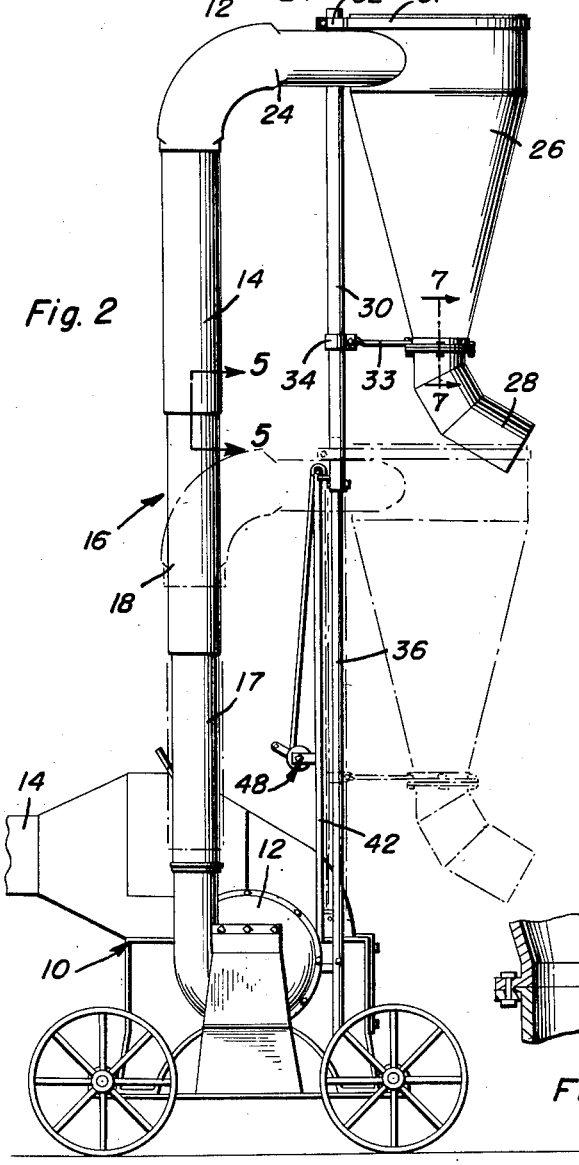
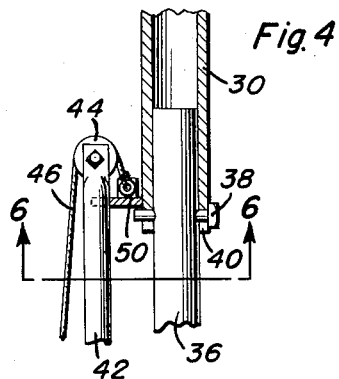
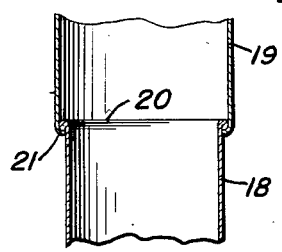
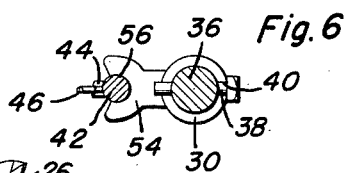
Theodore J. Stueven
INVENTOR.

2,703,733

FEED MILL BLOWER

Theodore J. Stueven, Pipestone, Minn.

Application January 8, 1951, Serial No. 204,998

4 Claims. (Cl. 302—37)

This invention relates to improvements in devices adapted particularly for farm use.

An object of this invention is to provide an improved wheeled vehicle having a blower thereon in order to deliver grain or like substances to a higher elevation, the elevation reached being capable of selection due to adjustment of the means carried by the vehicle and the direction of discharge of material being also capable of selection due to another adjustment.

Ancillary objects and features of importance will become apparent in following the description of the illustrated form of the invention.

In the drawings:

Figure 1 is a plan view of the device;

Figure 2 is a side view of the device in Figure 1;

Figure 3 is a transverse view illustrating details of construction;

Figure 4 is an enlarged sectional detail showing the means of raising and lowering the discharge spout and hopper;

Figure 5 is an enlarged sectional detail of construction taken substantially on the line 5—5 of Figure 2; and, Figure 6 is a sectional view taken substantially on the line 6—6 of Figure 4.

Figure 7 is a sectional view taken substantially on the line 7—7 of Figure 2, showing the rotatable connection between the discharge spout and hopper.

I have illustrated a wheeled vehicle 10 capable of locomotion and provided with a frame upon which a standard blower 12 is disposed. A grain or like substance inlet casing 14 is operatively connected with the blower for delivery of material into the blower and the outlet of the blower is provided with an extensible tube 16. This extensible tube is composed of any practical number of sections, the sections 17, 18 and 19 being illustrated. Each section is provided with an upper bead (Figure 5) 20 and the connected section is provided with a lower bead 21, the beads being arranged to contact each other to limit the extent of travel of the sections with respect to each other.

At the upper end of the tube 16 there is a laterally extending section 24 opening into a downwardly opening hopper 26, the hopper being provided with a discharge spout 28. The hopper is connected to a sleeve 30 by means of an upper strap 31 having a bearing 32 at one end, and a lower strap 33 which has a bearing 34 at one end. These bearings are secured to the sleeve 30 and accordingly the hopper 26 is mounted so that the outlet spout 28 may be rotated in any direction practicable as disclosed in Figures 3 and 7.

A vertical post 36 is secured to the frame of the vehicle 10 and has the sleeve telescopingly arranged thereon. The pole 36 is provided with a plurality of openings in order to accommodate releasably the locking pin 38 which constitutes a stop for the sleeve 30, releasably retaining it in selected elevated position when engaged by the slot 40 at the lower end of the sleeve 30.

Means for raising and lowering the sleeve 30 and hence the hopper 26 and also extending the extensible tube 16 is provided in connection with the sleeve and the vehicle. The preferable means consists of a vertical standard 42 which is fixed at its lower end to the vehicle and provided at its upper end with a pulley 44 over which the cable 46 extends. The lower end of the cable is attached to a ratchet controlled winding drum 48 which is disposed on and carried by the standard 42. The opposite end of the cable is fixed to the mounting bracket 50 which is fixed to a flange 54. The flange is welded or otherwise fixed to the tube 30 and is provided with a recess 56 which fits on the periphery of the standard or support 42.

In operation of this feature, the winding drum 48 is operated, thereby tightening the cable 46 and lifting the sleeve 30. Inasmuch as the hopper is fixed to the sleeve by means of the straps 31 and 33, the hopper is lifted. Since the extensible tube 16 is connected to the hopper, the tube is extended or retracted depending upon whether the sleeve 30 is raised by the winding drum 48 or lowered by gravity.

In operation the inlet member 14 is connected to a grinding device, hammer mill or the like, so that the grain or like material may be delivered through the outlet or spout 28 in any direction or at any height.

Having described the invention, what is claimed as new is:

1. In a portable feed mill blower having a base with a blower thereon, a vertically extensible stack extending upwardly from said blower, a hopper rigidly attached to the upper end of said stack, a vertically extensible standard mounted on said base adjacent said stack, means fixedly attaching said hopper to the upper portion of said standard, and means mounted on said base for raising and lowering said standard, whereby said stack and hopper will be raised and lowered.

2. The combination of claim 1, including a rotatable outlet spout on said hopper.

3. The combination of claim 1, wherein said raising and lowering means comprises a post mounted on said base, a reel on said post, a cable wound on said reel and attached at its free end to said extensible standard.

4. The combination of claim 1, wherein said means fixedly attaching said hopper to said standard includes brackets adjustably mounted at longitudinally spaced intervals on said standard.

References Cited in the file of this patent

UNITED STATES PATENTS

| Number | Name | Date |
|---|---|---|
| 225,001 | Dougine | Mar. 2, 1880 |
| 764,491 | Newlove | July 5, 1904 |
| 1,542,057 | Hovden | June 16, 1925 |
| 1,611,291 | Steege | Dec. 21, 1926 |
| 2,165,946 | Smith | July 11, 1939 |
| 2,441,292 | Schroeder | May 11, 1948 |
| 2,603,351 | Vedder | July 15, 1952 |